(No Model.) 4 Sheets—Sheet 1.
D. H. MERRITT.
EXTERNAL FRICTION BRAKE BAND FOR HOISTING MACHINERY.

No. 312,146. Patented Feb. 10, 1885.

Witnesses  
Robert Everett,  
George W. Rea

Inventor  
Daniel H. Merritt.  
By Vinton Coombs  
Atty.

(No Model.)  4 Sheets—Sheet 2.

D. H. MERRITT.
EXTERNAL FRICTION BRAKE BAND FOR HOISTING MACHINERY.

No. 312,146. Patented Feb. 10, 1885.

Witnesses,
Robert Everett,
George W. Rea

Inventor,
Daniel H. Merritt,
By Vinton Coombs
Atty.

(No Model.)

D. H. MERRITT.
EXTERNAL FRICTION BRAKE BAND FOR HOISTING MACHINERY.

No. 312,146. Patented Feb. 10, 1885.

4 Sheets—Sheet 3.

Witnesses.
Robert Everett,
George W. Rea

Inventor
Daniel H. Merritt,
By Vinton Coombs
Atty.

(No Model.) 4 Sheets—Sheet 4.

D. H. MERRITT.
EXTERNAL FRICTION BRAKE BAND FOR HOISTING MACHINERY.

No. 312,146. Patented Feb. 10, 1885.

Witnesses.
Robt Errett,
George W. Rea.

Inventor.
Daniel H. Merritt,
By Victor Coombs
Atty.

UNITED STATES PATENT OFFICE.

DANIEL H. MERRITT, OF MARQUETTE, MICHIGAN.

EXTERNAL FRICTION-BRAKE BAND FOR HOISTING MACHINERY.

SPECIFICATION forming part of Letters Patent No. 312,146, dated February 10, 1885.

Application filed November 26, 1884. (No model.)

*To all whom it may concern:*

Be it known that I, DANIEL H. MERRITT, of Marquette, in the county of Marquette and State of Michigan, have invented certain new and useful Improvements in External Friction-Brake Bands for Hoisting Machinery; and I do hereby declare that the following is a full, clear, and exact description of the invention, which will enable others skilled in the art to which it appertains to make and use the same, reference being had to the accompanying drawings, which form a part of this specification.

My invention relates to external friction-brake bands for hoisting and other machinery, and more particularly to improvements on the patent granted to me July 31, 1883, No. 282,349, whereby under my present improvements, among other features, said clutch and brake band may be operated by fluid-pressure, (steam or hydraulic,) so that the action of said parts will be more positive and quicker; and the invention consists in the construction and also in the combination of parts, hereinafter more particularly described and specified.

Figure 1:
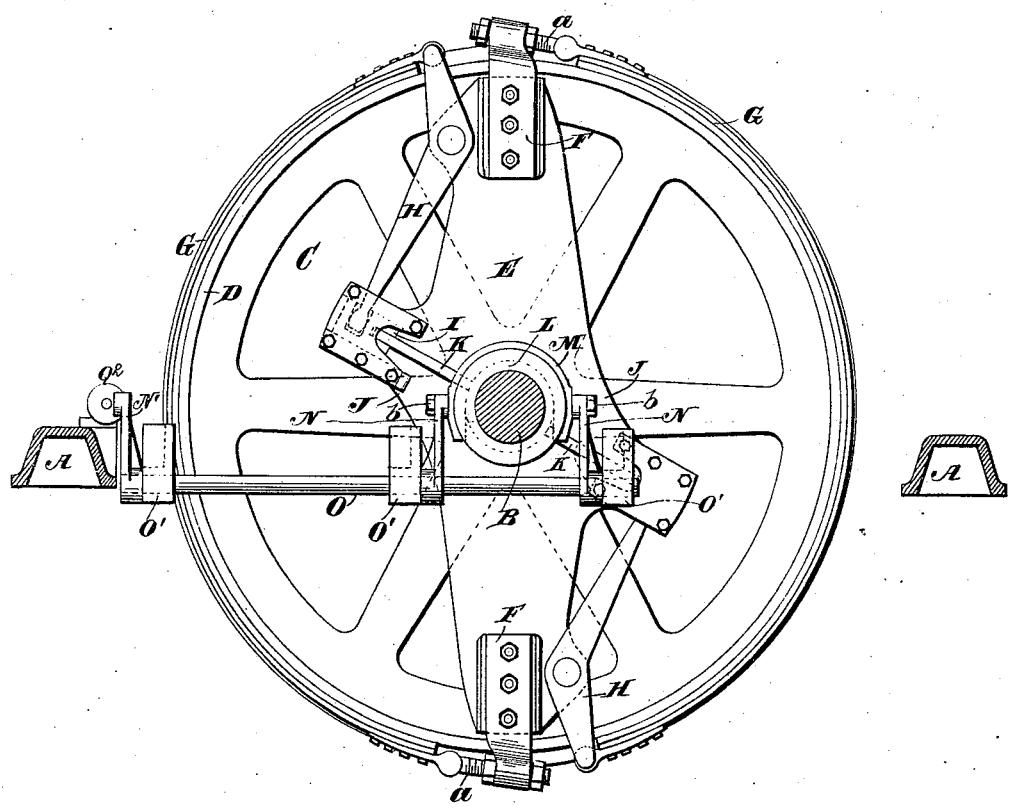
Figure 2:
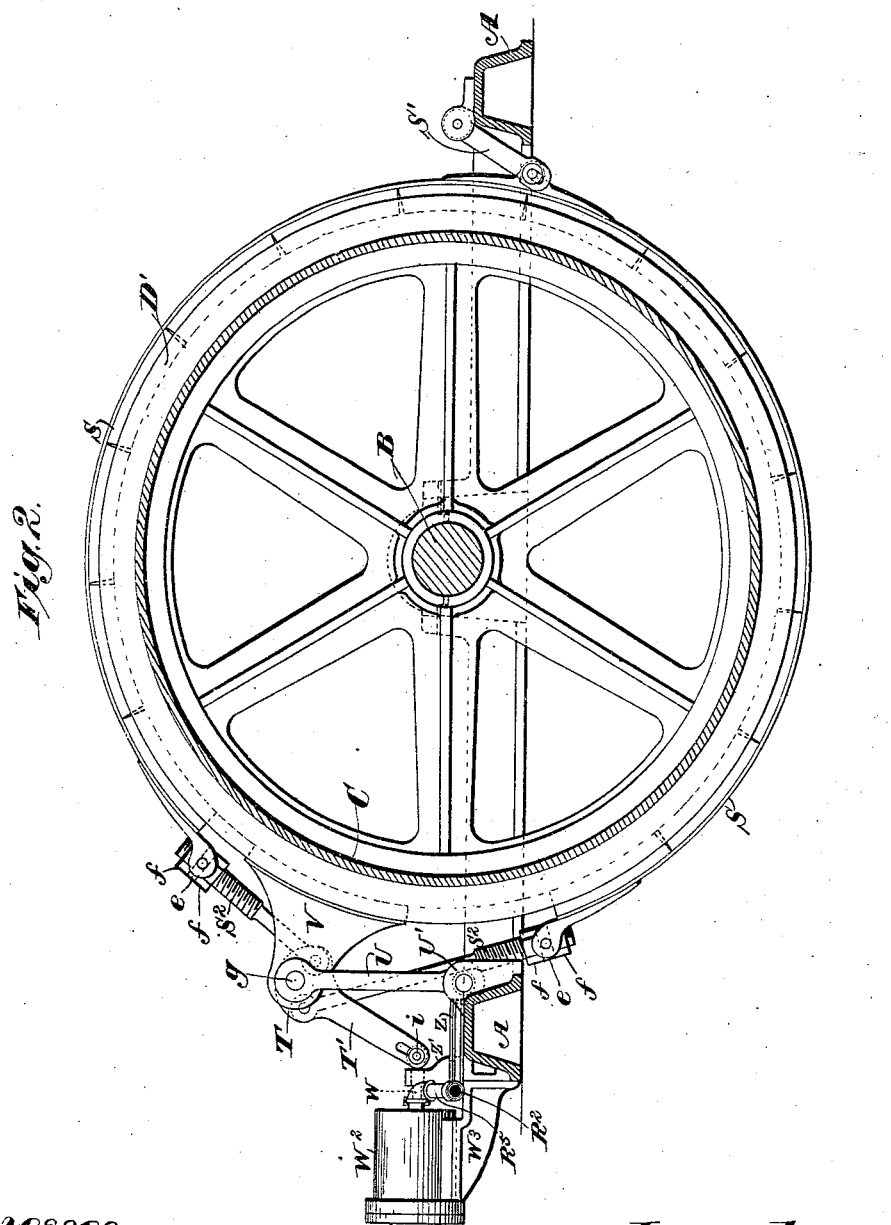
Figure 3:
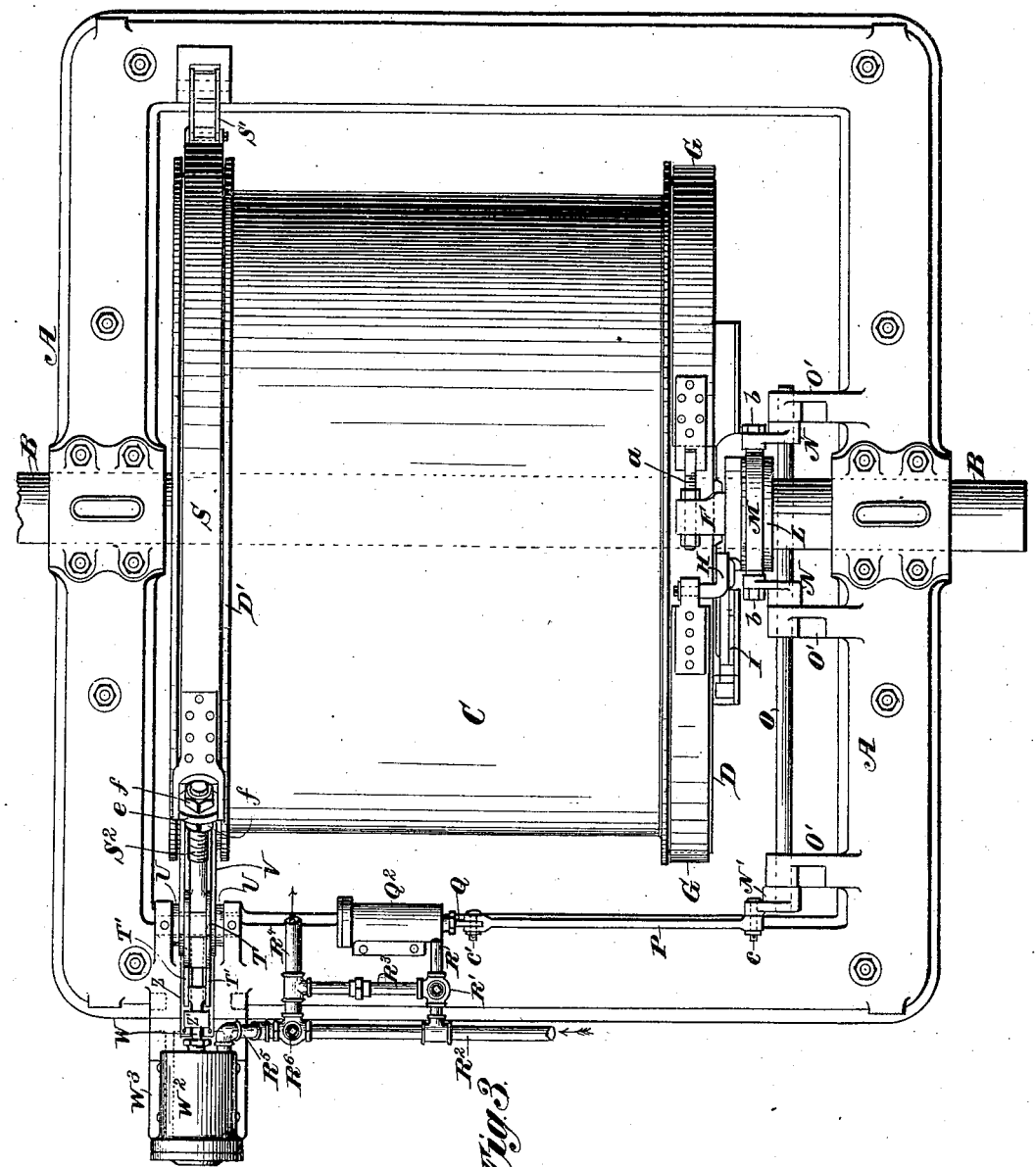
Figure 4:
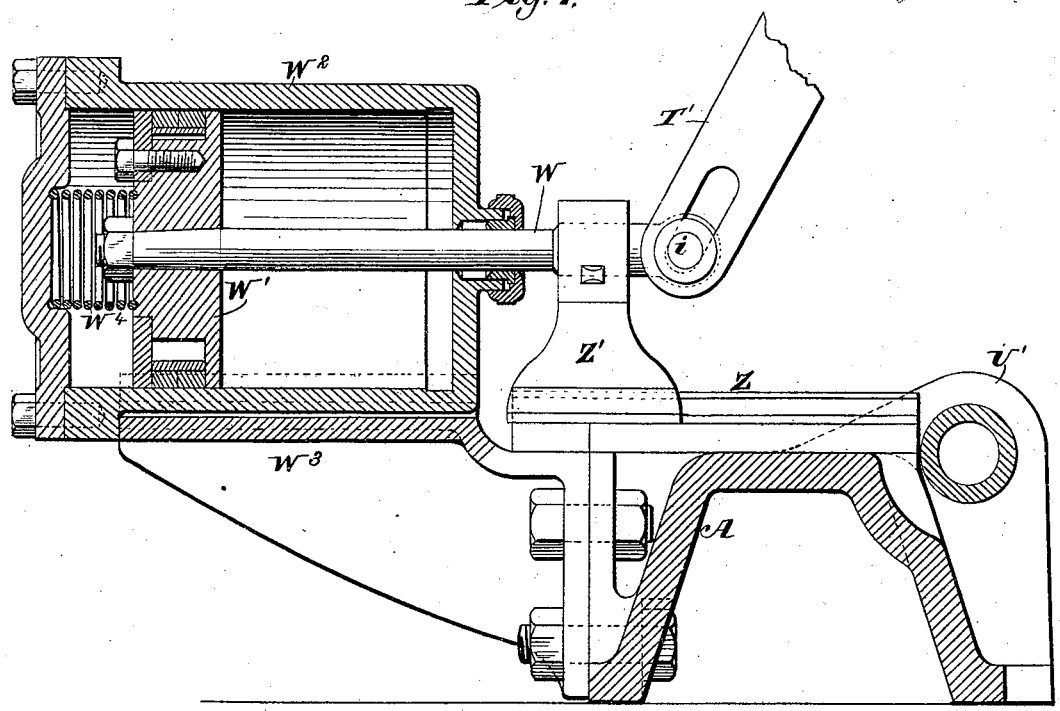
Figure 5:
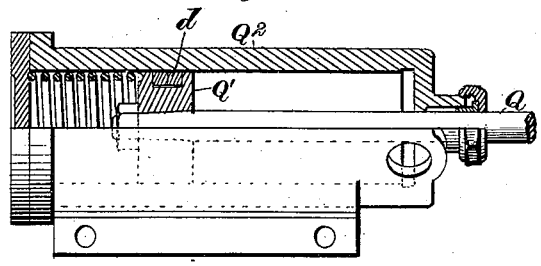

In the accompanying drawings, Figure 1 is an end elevation of the hoisting-drum and section of the supporting-frame, showing the clutch-bands and their connections. Fig. 2 is a cross-section through the drum, showing the brake-band and its connections with the brake-cylinder, the supporting-frame being in section. Fig. 3 is a plan of the drum, its supporting-frame, the clutch and brake cylinders, and other parts. Fig. 4 is a longitudinal section through the brake-cylinder and a cross-section through the frame, showing the connection of the cylinder thereto and the carriage in elevation. Fig. 5 is a longitudinal section through the clutch-cylinder.

In the said drawings, the letter A designates a frame, which supports in suitable boxes a shaft, B, rotated by gears and shafts operated from an engine or other power under any suitable arrangement, not illustrated, as such forms no part of my invention. The shaft B carries loosely upon it a drum, C, which has rigidly secured to its opposite ends brake-wheels D and D', which may be cast therewith or formed separate therefrom, but secured thereto.

To the shaft B there is keyed a driver, E, preferably revolving within the brake-wheel D, and having thrust-plates F bolted thereto and extended over above the periphery of the brake-wheel D, where they are formed with eyes for the attachment, by means of adjusting-screws $a$, of one end of the hoisting brake-band clutches G, which have a hinged connection to the said adjusting-bolts. The other ends of said clutches are hinged by a bolt or pin to the short arm of the bell-crank levers H, which are fulcrumed to said driver and have their long arms fitted into blocks I, which slide in suitable ways formed in extensions J of the driver. These blocks are connected by toggle bars or arms K to a collar, L, which slides upon the shaft B, so that when said collar is moved in one direction or another said blocks will be slid out or in to move the bell-crank levers to apply or release the band-clutch.

The construction and arrangement of the parts so far referred to are the same, or may be substantially so, as the same parts in my patent hereinbefore referred to, and therefore need not here be more particularly described.

Description will now be made of my present invention. A strap, M, straddles the collar L, fitting in a groove therein, and to its opposite ends are secured by bolts or pins $b$ one end of the cranks N, which are sleeved and keyed to a shaft, O, turning in suitable bearings, O', extending from the frame A. The connection of said cranks to said shaft and strap is such, as shown, that when the shaft is turned in one direction the collar will be moved forward to throw out the toggle-arms, and when turned in the opposite direction will move the collar back, so as to draw in the toggle-arms, and, through them and the other described parts, clamp and unclamp the clutch-bands upon the hoisting-drum.

To the end of the shaft O is secured a crank, N', to the arm of which is connected by a pin, $c$, one end of a pitman-rod, P, the other end being hinged by a pin, $c'$, to the end of the piston-rod Q, the piston Q' of which works in a cylinder, $Q^2$, bolted to the frame A, and to be designated as the "clutch-band cylinder." A pipe, R, provided with a three-way cock, R', communicates with the clutch-band cylinder in front of its piston, and with a main pipe, $R^2$, which may connect with the boiler of the steam-engine that may be used to drive the parts, so as to lead steam from the boiler to said cylinder to force the piston backward, so as to draw the pitman-rod to turn the crank-shaft, and through it and intermediate connections apply the clutch-bands, so as to turn the hoisting-drum. When the clutch is to be released from the drum, the three-way cock R' is turned so as to cut off communication between the main pipe and clutch-band cylinder, and open communication between the latter and an auxiliary exhaust or exit pipe, R³, which connects with a main exhaust pipe, R⁴. When the steam is thus allowed to escape from cylinder Q², a coiled or other suitable spring located within the cylinder back of the piston, and bearing against the latter and the end of the cylinder, forces the piston outward, so as to reverse the movement of the crank-shaft O, and thus relieve the clutch-bands of their grip on the cylinder, so as to cease to revolve it. A stuffing-box and gland are provided, as usual, for the piston-rod, and the piston also is provided with packing $d$, as usual.

A brake-band for stopping the revolution of the hoisting-drum is designated by the letter S. This band encircles the brake-wheel D', and between its ends is supported from the frame A by a link, S', having a hinged connection with the band and frame. The two ends of the band are bifurcated, and within each bifurcation is pivoted a block, $e$, through which passes the threaded and hence adjustable bolt S², nuts $f$ being applied to each bolt on opposite faces of the pivoted block. The other ends of the bolts are pivoted by pins to the cam-head T of the lever T', on opposite sides of the fulcrum-point of said head, the head being fulcrumed by a bolt, $g$, passed through it and one end of the two link-bars U, which are hinged at their lower ends by a bolt to the ears U', extending from the frame. The bolt $g$ also serves as a hinge for the block or shoe V, which at its base is curved to correspond with the face of the brake-wheel, against which it may lightly press, the side flanges of the wheel preventing side movement of the block or shoe. The block or shoe is formed with two sides or ears, as shown, or otherwise, so as to permit the movement of the bolt S² and other parts, as shown by dotted lines. The lower end of the lever-arm T' is slotted lengthwise, and connected by a bolt, $i$, passed through said slot to the rod W of the piston W', which works in the brake-cylinder W², the said piston being preferably of the construction shown, with its elastic metallic packings, although it may be of any other approved construction, and the piston-rod, packing, and glands being applied as usual. The brake-cylinder is supported upon a suitable bearing, W³, bolted to the frame A. To said frame there are also bolted, as shown, guide-bars Z, on which travels a carriage, Z', for the support of the piston-rod, said rod passing through the upper part of the carriage and being keyed thereto. The main pipe R² communicates with the brake-cylinder in front of its piston through a neck, R⁵, and at the point of communication between the main pipe and main exhaust-pipe, near the juncture of the neck and main pipe, there is a three-way cock, R⁶. After the clutch-band has been released and the brake-band is to be applied to check or stop the revolution of the drum, the three-way cock R⁶ is turned so as to permit the steam to pass into the brake-cylinder to force back the piston W'. This movement pulls back the arm of the eccentric cam-lever T',and turns its head, so as to pull the bolts S² toward each other, and thus bring the brake-band to bear against the brake-wheel D', so as to stop the drum. At the same time that the brake-band is applied, the movement of the eccentric-lever and links to permit such application also throws the block or shoe V against the brake-wheel, so that it, too, will serve as a brake-shoe; but while the shoe may have such function its main use is to aid in holding the link-bars U in position to serve as the fulcrum-support for the eccentric or cam lever T'. When the brake-band is to be released, the three-way cock R⁶ is turned so as to let the steam escape from the cylinder into the main exhaust-pipe R⁴, when a coiled metallic or other suitable spring, W⁴, within the cylinder, and bearing against it and the piston, will force the piston outward so as to turn the eccentric-lever to release the brake-band. By turning the three-way cocks more or less the pressure of the steam within the cylinders may be controlled so as to regulate the pressure of the brakes on the drum.

It is apparent that instead of using steam, hydraulic pressure or compressed air may be employed with the same arrangement for effecting the same ends, in which event the water or air would be drawn from an accumulator or receiver under pressure in the usual way, instead of taking steam from the engine-boiler.

Having thus described my invention and set forth its merits, what I claim is—

1. In a clutch for hoisting and other machinery, the combination of a shaft, a drum mounted loosely thereon, a driver rigidly secured to said shaft, bell-crank levers pivoted to said driver, clutch-bands to encircle a part of said drum, connected at one end with said bell-crank levers, a sliding collar and arms connecting with one end of said bell-crank levers, a crank-shaft connecting with said collar, a piston-cylinder and its piston connected with said crank-shaft, and a pressure-supply pipe communicating with said cylinder to supply an agent to operate said piston, substantially as described.

2. The combination, with the drum and the brake-band, of the eccentric-lever connected with opposite ends of the brake-band, the brake-cylinder and its piston connected with said lever, and a pressure-supply pipe communicating with said cylinder to supply an agent to operate said piston, substantially as described.

3. The combination, with the drum and the brake-band, of the hinged link-bars, the block or shoe, and the eccentric-lever having opposite ends of the brake-band secured thereto, fulcrumed on said bars, the brake-cylinder and its piston connected with said lever, and the pressure-supply pipe communicating with said cylinder to supply an agent to operate said piston, substantially as described.

4. The combination, with the drum and the brake-band, of the eccentric-lever having opposite ends of the brake-band connected thereto, the brake-cylinder, the piston having its rod connected to said lever, the carriage for supporting the piston-rod, and the pressure-supply pipe communicating with the cylinder, substantially as and for the purpose described.

5. The combination, with the drum and the brake-band, of the hinged link-bars, the shoe, and the eccentric-lever fulcrumed thereto, the adjusting-bolts connecting opposite ends of the brake-band to said lever, the brake-cylinder, the piston and its rod connected to said lever, the carriage traveling with the piston-rod for supporting the same, and the pressure-supply pipe communicating with said cylinder to supply an agent to operate the piston, substantially as described.

6. The combination, with the hoisting drum and clutch and brake-bands therefor, of the clutch and brake piston cylinders, the main pressure-supply pipe having communication with both cylinders, an exhaust-pipe for each piston-cylinder, and a three-way cock for each cylinder to apply the pressure to one cylinder while cut off and exhausted from the other, substantially as described.

7. The combination of the clutch and brake cylinders, the springs in each cylinder to restore the pistons to their normal positions after the fluid-pressure has been taken off, the main pressure-supply pipe connected with the brake-cylinder, the pipe for connecting the said supply-pipe with the clutch-cylinder, the exhaust-pipe leading from the main supply-pipe, and the three-way cock at their juncture, the pipe for connecting the clutch-cylinder pipe with the exhaust-pipe, and the three-way cock at the juncture of said connecting-pipe and clutch-cylinder pipe, substantially as described.

DANIEL H. MERRITT.

Witnesses:
M. H. MAYNARD,
ED A. MERRITT.